June 30, 1925. 1,543,800
W. M. SHEWRY
NESTABLE CONTAINER
Filed Aug. 15, 1923
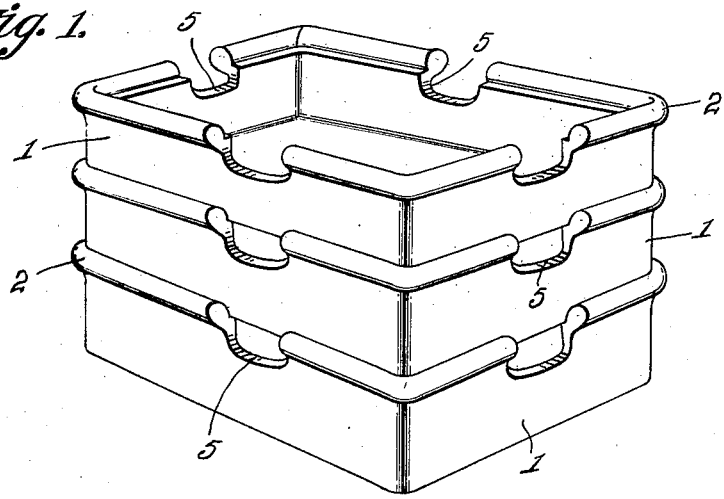
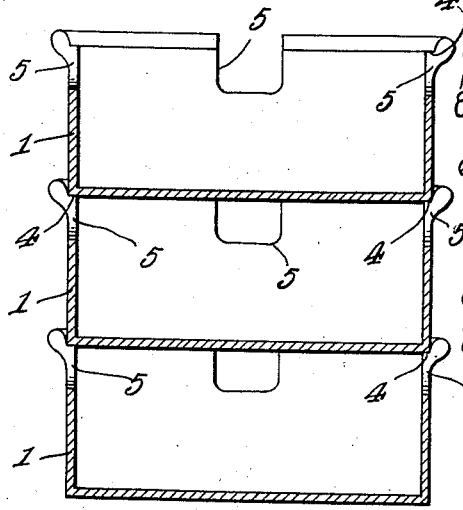
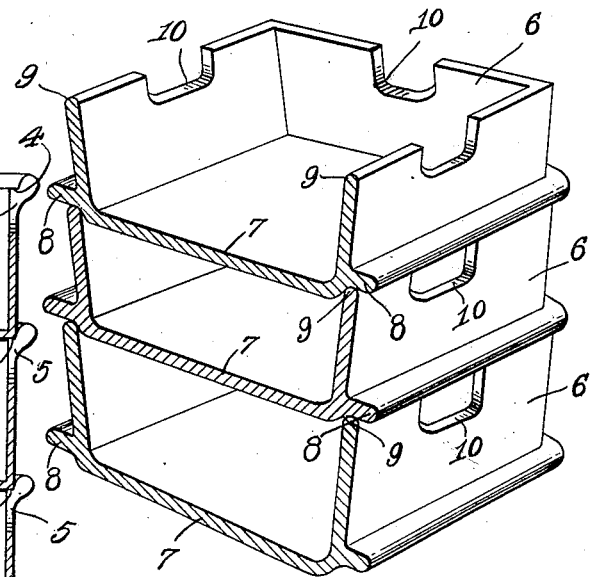
William M. Shewry
INVENTOR
BY Victor J. Evans
ATTORNEY
WITNESS:

Patented June 30, 1925.

1,543,800

UNITED STATES PATENT OFFICE.

WILLIAM M. SHEWRY, OF CHICAGO, ILLINOIS, ASSIGNOR TO SPACE SAVER DISH COMPANY, A CORPORATION OF ILLINOIS.

NESTABLE CONTAINER.

Application filed August 15, 1923. Serial No. 657,571.

*To all whom it may concern:*

Be it known that I, WILLIAM M. SHEWRY, a citizen of the United States, residing at Chicago, in the county of Cook and State of Illinois, have invented new and useful Improvements in Nestable Containers, of which the following is a specification.

The object of this invention is the production of a sanitary or hygienic kitchen dish or food container of a construction whereby a plurality of dishes, each containing different food stuffs may be nested one on the other to conserve space in a pantry, ice box, etc., and wherein each dish has its upper edge notched at opposed points to provide air inlets into the compartments formed by the dishes.

Another object of the invention is the novel manner of forming the upper edge portion of each dish so that the bottom of each dish may be of a uniform area and engaging with each other in a manner to be snugly arranged in stack formation.

Besides the above my invention is distinguished in providing ventilating openings in the form of notches or depressions in the upper edge of each dish which co-act with the bottom of the adjacent dish to regulate the size of notch and thereby the ventilation of the dish.

To the attainment of the foregoing and other objects which will present themselves as the nature of the invention is better understood, reference is to be had to the drawing which accompanies and which forms part of this application.

In the drawing:—

Figure 1 is a perspective view of a plurality of nested food containing dishes in accordance with this invention.

Figure 2 is a vertical longitudinal sectional view therethrough in a line with the ventilating notches at the upper edges of the dishes.

Figure 3 is a sectional perspective view of nested dishes illustrating a slight modification.

Again referring to the drawing it will be noted that the dishes are arranged in stack formation in a very compact manner with the bottom of each dish resting upon the upper edge of the adjacent dish and closing the open side of the notches to restrict the capacities of the various notches to assure the best ventilating results. As the dishes are of identical construction the following description will be limited to a single dish.

The dish 1 which may be of any required shape, although shown rectangular in the drawing, is provided in its upper edge portion with a plurality of depressions or notches 5 which are of a relatively small area compared with the area of the side walls of the dish. Flanges 2 extend around the upper edge of the dish from one notch to the other notch and extend laterally so as to be positioned out of alignment with the side walls of the dish. Thus it will be seen that the bottom of the dishes can be of equal area and may rest flatly upon the upper edges to be held against accidental dislocation by the engaging action of the flanges with the side walls of the dishes. It will also be noted that the bottom of a dish closes the open side of the notches; that is to say, the opening necessary in the retraction of the mold plunger, and thus the size of the notches are restricted to assure the proper ventilating of the dishes, which is very, very important to prevent souring of the food contents and the accumulating of condensation on the interior walls of the dishes. A very important feature is that when the dishes are used for the purpose of baking and are removed from the oven the cooling action is relatively slow, due to the limited area of the notches.

As the bottom of one dish forms a closure for the other dish and the size of the notches is relatively small, dust or other foreign matter is prevented from entering into the food. It is of course to be understood that the dishes may be of various sizes, as illustrated, as the main purpose of my invention is the provision of a compact stack arrangement of dishes having the proper ventilating features and which may be economically manufactured.

In Figure 3, the general shape of the dishes 6 is substantially similar to that above described. However, the walls of these dishes are of an equal thickness throughout and the side and end walls are preferably inclined outwardly from the bottom wall. The side and end walls at a slight distance from their juncture with the bottom wall 7 are formed with an outwardly extending flange 8 and the flanges 8 of the superimposed or nested dishes are designed to rest on the rounded edge 9 of the remaining dishes of the series. The edges 9 are provided with inwardly rounded notches 10 arranged at diametrically opposite points on their sides and ends. These notches permit of a free circulation of air through the nested dishes and also permit the entrance of the fingers of the hands of the operator when gripping the flanges of the dishes for arranging the same one on the other or for removing the said dishes.

It is thought that the foregoing description, when taken in connection with the drawing, will fully set forth the construction and advantages of my improvement to those skilled in the art to which my invention relates. It will be noted that each dish may contain a different food stuff, and as the dishes are comparatively small in size, the same can be easily arranged in an ice box, pantry or the like, and will occupy small space therein.

Having described the invention, I claim:—

1. As a new article of manufacture, a pair of rectangular superimposed dishes, the upper having its bottom resting directly upon the upper edge of the lower dish and one dish having a flange extending therearound out of alignment with its side walls for engaging with the other dish for holding said bottom in engagement with said edge, each dish having notches formed in all of its side walls and opening through its upper edge.

2. As a new article of manufacture, a pair of superimposed dishes, the lower having notches formed in its upper edge portion, flanges extending from one notch to the other and also laterally positioned out of alignment with the side walls of the dish, said upper dish having its bottom resting flatly upon the upper edge of the lower dish with its side walls engaged by said flanges said bottom of the upper dish forming a closure for the lower dish and restricting the area of the notches.

In testimony whereof I affix my signature.

WILLIAM M. SHEWRY.